(12) United States Patent
Becker

(10) Patent No.: US 9,914,360 B2
(45) Date of Patent: Mar. 13, 2018

(54) GEARSHIFT OPTIMIZATION GAUGE

(71) Applicant: Daniel Isaac Becker, Raleigh, NC (US)

(72) Inventor: Daniel Isaac Becker, Raleigh, NC (US)

( * ) Notice: Subject to any disclaimer, the term of this patent is extended or adjusted under 35 U.S.C. 154(b) by 209 days.

(21) Appl. No.: 14/668,969

(22) Filed: Mar. 25, 2015

(65) Prior Publication Data

US 2015/0367732 A1 Dec. 24, 2015

Related U.S. Application Data

(60) Provisional application No. 61/970,080, filed on Mar. 25, 2014.

(51) Int. Cl.
*B60K 37/02* (2006.01)
*G01P 1/08* (2006.01)

(52) U.S. Cl.
CPC ............. *B60K 37/02* (2013.01); *G01P 1/08* (2013.01); *B60K 2350/1072* (2013.01)

(58) Field of Classification Search
CPC .... B60K 37/02; B60K 2350/1072; G01P 1/08
USPC ........ 116/62.4, 286–288, 305, 334, DIG. 36, 116/62.1, 62.2, 63.3; 362/23.01, 23.18, 362/23.21, 85; 235/103.5 R
See application file for complete search history.

(56) References Cited

U.S. PATENT DOCUMENTS

| | | | | |
|---|---|---|---|---|
| 1,439,137 A * | 12/1922 | White | .................... | G01P 3/56 235/103.5 R |
| 1,467,847 A * | 9/1923 | Fulton | .................... | G01F 9/026 235/112 |
| 2,189,536 A * | 2/1940 | Stuerzl | .................... | B60K 37/02 116/62.4 |
| 2,879,940 A * | 3/1959 | Cornell, III | ............ | B60K 37/00 116/28.1 |
| 3,565,206 A * | 2/1971 | Managhan | ................ | G01P 1/11 180/170 |
| 3,610,056 A * | 10/1971 | Bartholomew | ............ | F16C 1/06 464/52 |
| 3,980,041 A * | 9/1976 | Evans | ........................ | G01P 1/08 116/62.3 |
| 4,633,803 A * | 1/1987 | Flowers | ................. | G01D 13/02 116/303 |
| 4,663,718 A * | 5/1987 | Augello | .................... | G07C 5/10 340/462 |
| D378,500 S * | 3/1997 | Nakai | .......................... | D10/103 |
| 5,838,259 A * | 11/1998 | Tonkin | ................... | B60Q 1/444 340/464 |
| 5,916,298 A * | 6/1999 | Kroiss | ................. | B60R 16/0232 701/123 |
| 6,310,544 B1 * | 10/2001 | Cohen | .................... | G01D 13/26 116/334 |

(Continued)

*Primary Examiner* — R. A. Smith
*Assistant Examiner* — Tania Courson
(74) *Attorney, Agent, or Firm* — Daniel Becker, Attorney at Law, PLLC.

(57) ABSTRACT

A combined vehicle-speed and engine-speed indicating device that replaces or supplements the function of a manufactured vehicle's existing radial-dial tachometer and radial-dial speedometer with a single coordinate field and two translating indicators that follow paths set to a vehicle's set of overall-gear ratios correlating with each of its transmission's driver-selectable gears to give a vehicle's driver a tool by which to optimize selection of gear ratio, engine speed, and vehicle speed for smooth and efficient progress in a vehicle.

19 Claims, 7 Drawing Sheets

(56) References Cited

U.S. PATENT DOCUMENTS

| | | | | |
|---|---|---|---|---|
| 6,564,635 B2* | 5/2003 | Sherman | ............... | F16C 19/50 |
| | | | | 324/179 |
| 6,600,409 B2* | 7/2003 | Cohen | ............... | G01P 1/08 |
| | | | | 116/62.3 |
| 7,237,203 B1* | 6/2007 | Kuenzner | ............... | B60K 35/00 |
| | | | | 701/123 |
| 7,598,849 B2* | 10/2009 | Gallant | ............... | B60K 35/00 |
| | | | | 116/37 |
| 8,443,751 B2* | 5/2013 | Pawusch | ............... | G01D 7/08 |
| | | | | 116/28 R |
| 8,550,410 B2* | 10/2013 | Fraser | ............... | B60R 11/02 |
| | | | | 248/205.1 |
| 2006/0278155 A1* | 12/2006 | Soltendieck | ............... | B60K 37/02 |
| | | | | 116/62.4 |
| 2009/0273459 A1* | 11/2009 | Crave | ............... | F16H 63/42 |
| | | | | 340/441 |
| 2013/0291629 A1* | 11/2013 | Falzarano | ............... | B60K 37/02 |
| | | | | 73/114.01 |
| 2017/0073049 A1* | 3/2017 | Schoore | ............... | B63B 49/00 |

\* cited by examiner

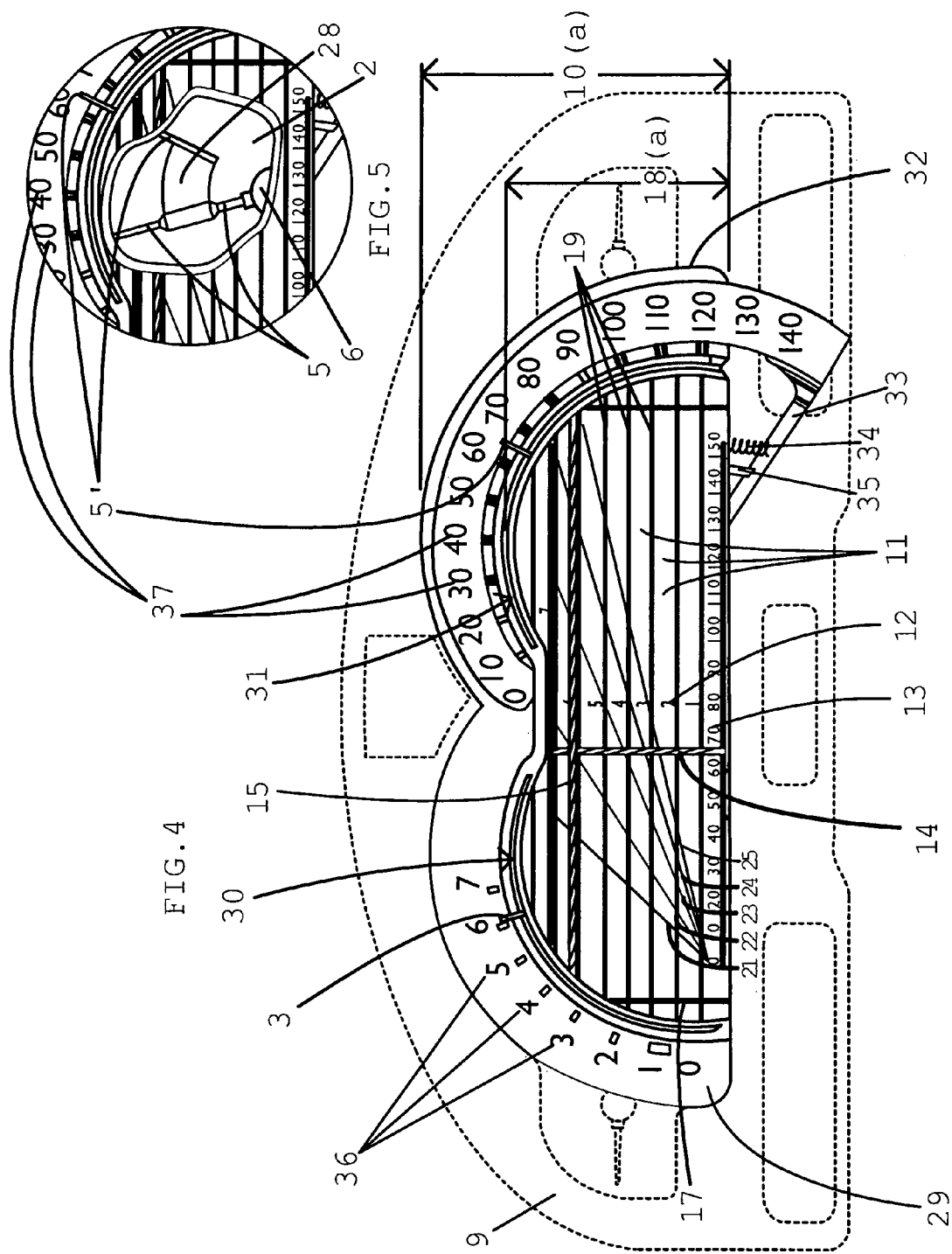

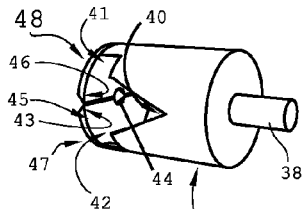
FIG. 6A(1)
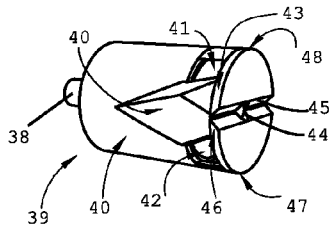
FIG. 6A(2)
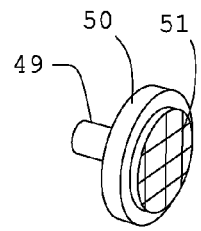
FIG. 6B
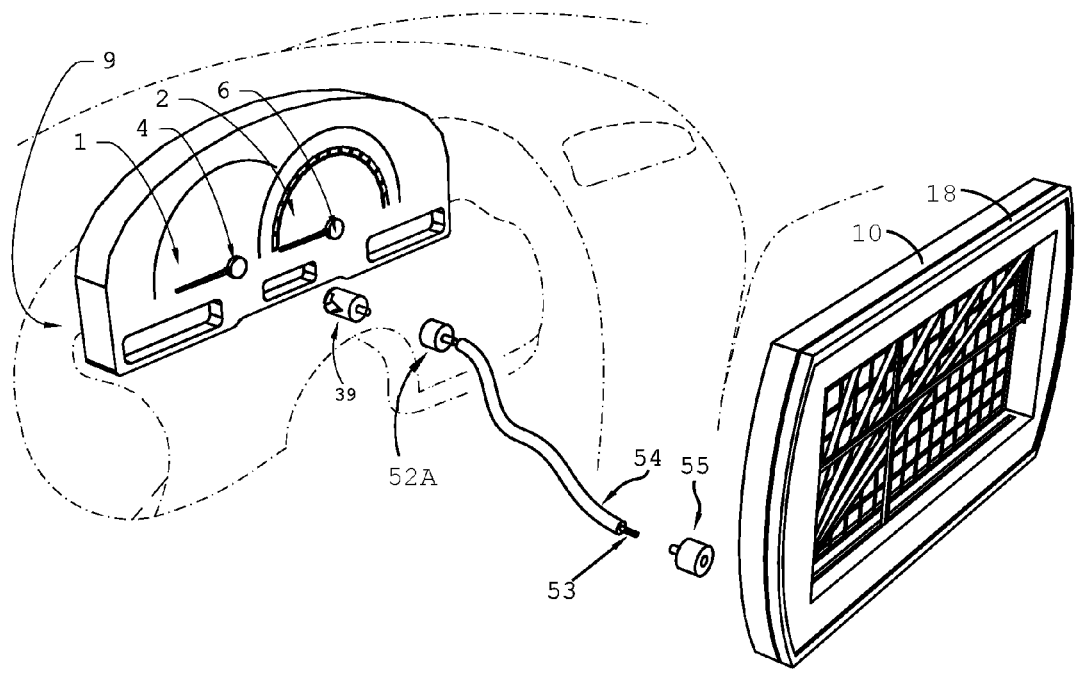
FIG. 6C
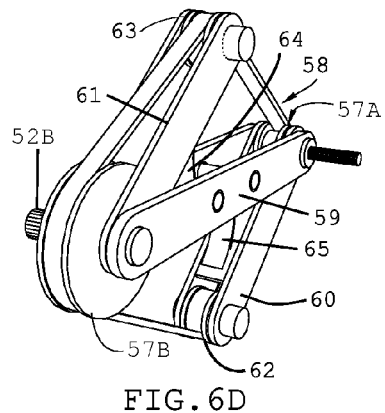
FIG. 6D
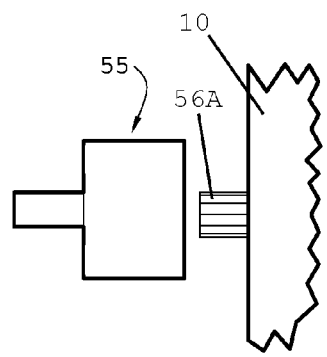
FIG. 6E

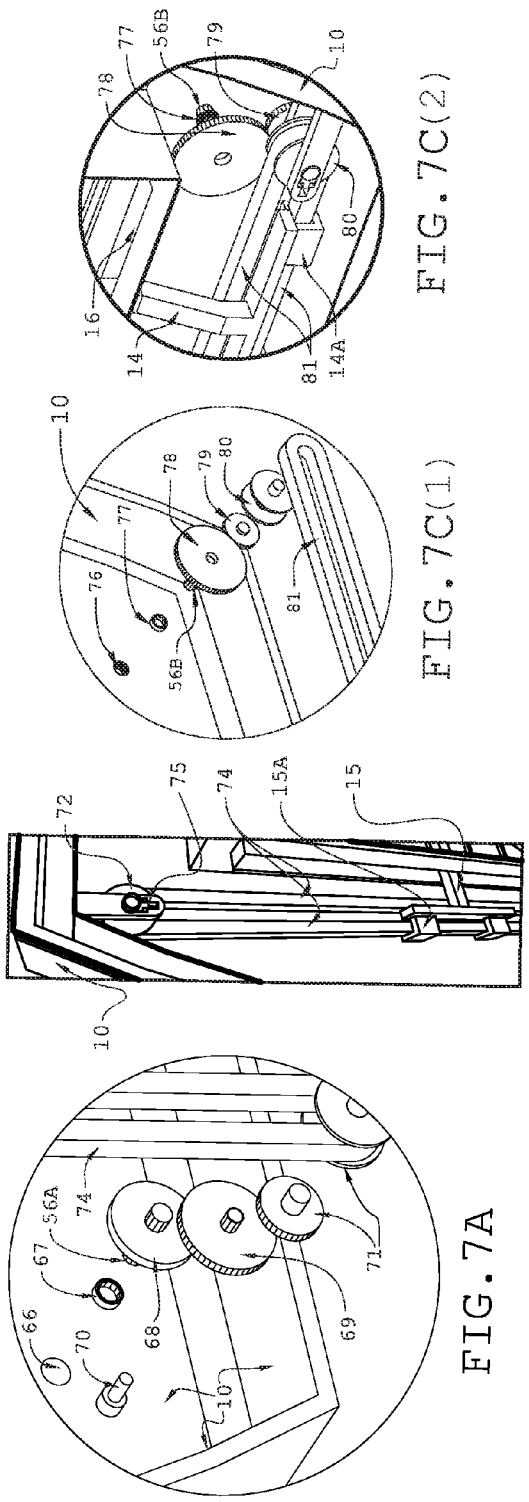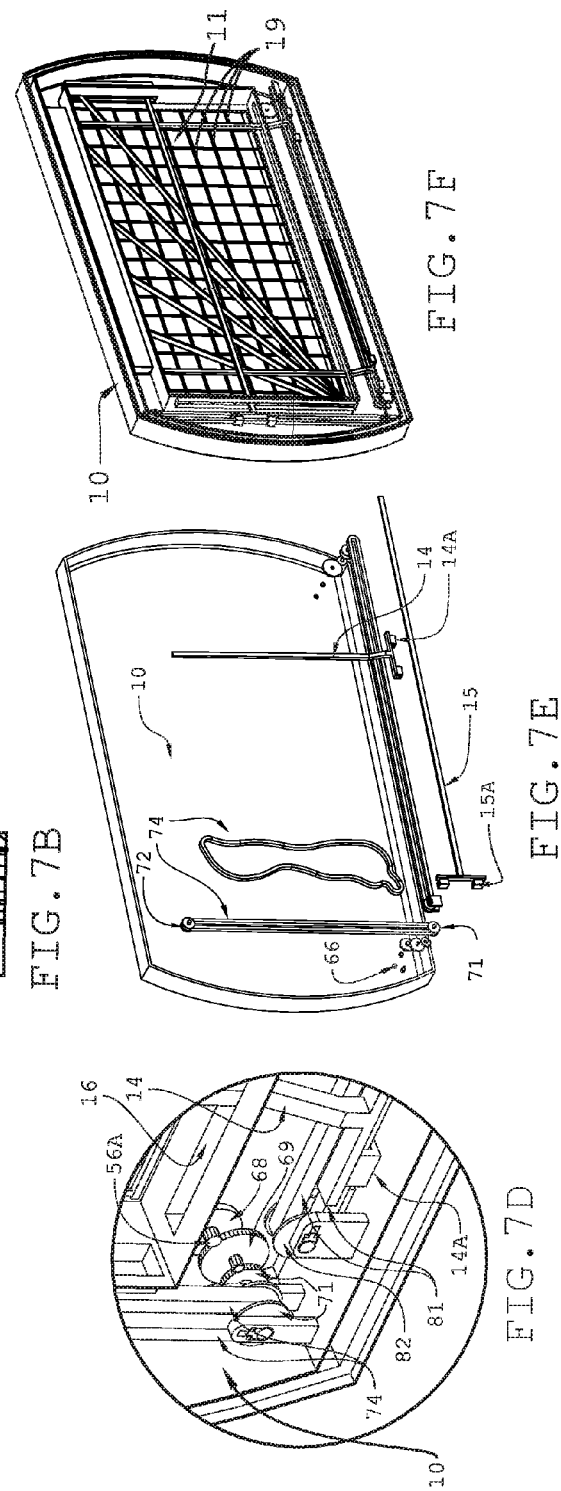

GEARSHIFT OPTIMIZATION GAUGE

FIELD OF THE INVENTION

The present invention relates to speed-indicating devices, particularly automobile speedometers and tachometers and the task of balancing engine and vehicle speeds and smoothly engaging gearsets corresponding to ratios of engine and vehicle speeds and devices indicating the proportional rate of change between those vehicle and engine speeds.

BACKGROUND OF THE INVENTION

The conventional vehicle speedometer is a relatively simple device used to monitor the speed of a vehicle. How fast a vehicle actually moves at any instant is relatively unimportant but the speedometer itself has real importance in that by offering live speed data, it can be used by a vehicle's driver to estimate other more substantive external effects, such as his travel time, his fuel consumption, his miles traveled, his required distance to brake, his speed relative to other cars and to prudence and legal limits, and also, particular to this invention, the vehicle's driven speed relative to the vehicle's engine's rotation speed.

The internal combustion engine is often a powerful device, but it is a finicky one, capable of operation at a relatively narrow range of speeds. To adapt a typical internal combustion engine (or any engine or motor) to the task of motivating a heavy automobile rapidly between speeds as low as zero and as high 100 mph or more, it requires a scaling device typically embodied by a multiple gear ratio, fixed-ratio transmission. A transmission, in serving the task of rapidly scaling an engine's speed and torque against a vehicle's momentum, is subject to violent forces in the hands of the careless driver, particularly where a driver is attempting a quick gearchange with a manual transmission. Over time, a driver learns where appropriate engine and vehicle speeds coincide for each ratio of the transmission, but usually this results in either abuse of the vehicle's clutch or driving so conservatively, relative to a vehicle's performance envelope, as to render much of the reason for buying a vehicle of a given set of performance abilities redundant and unused.

To assist consumers in monitoring engine speed relative to a vehicle's speed, vehicle manufacturers currently provide most vehicles with a second speed indicator, a tachometer, specifically for the vehicle's engine. Alongside a vehicle's speedometer, a driver can thus see the actual rate of engine speed relative to the vehicle's speed as it accumulates, and better estimate when to shift between gears. However, this creates the problem of there being too many things moving around in front of the driver. To truly pay attention, a driver has to constantly flick his eyes back and forth between the road, the speedometer, and the engine speed tachometer, and shift gear accordingly. With a single gauge, less time is spent with one's eyes off of the road.

Also, since both the vehicle's wheels and the vehicle's engine are rotating elements, it has usually been easier and cheaper to design reliable and accurate gauges which merely rotate the tip of a needle around an arc. Therefore, to track vehicle speed and engine speed, a driver has to locate the tip of a needle somewhere within that arc, rather than looking for a single point within the vehicle that indicates both vehicle speed and engine while additionally moving in a purely translative fashion to convey rate of acceleration. Separate dials, despite the additional information about the specific speed of the engine, still require the driver to guess about how vehicle speed is specifically related to the engine speed in each gear to facilitate a smooth gearchange, especially for downshifts while braking for a turn in predication of rapid acceleration on exiting the turn. It is therefore desirable to provide a single gauge that allows tracking of both vehicle speed and engine speed to facilitate quick scans of the instrument panel as well as to provide a visual relation between vehicle speed and engine speed, in order to guide adjusting the two variables, to clearly change gears.

Of late, however, the providing of separate tachometers and speedometers horizontally and prominently displayed alongside one another has become so common among manufactured automobiles that it is desirable to provide a single device that can be adapted to a variety of tachometers and speedometers already in production so that many consumers can attach a combined single-point and engine speed tachometer to their existing car without having to wait for a major car manufacturer to offer it as an option.

One example of a combined, single point speedometer and engine speed tachometer is disclosed in U.S. Pat. No. 1,439,137 to White, which discloses a speed indicator having a single point of intersection for two needles, each needle displaying a corresponding value for the speed of a rotating device, with paths drawn on the background of the gauge to illustrate when the relative rotation speeds of the two devices correspond to gearing ratios between the two devices. The device uses two typical pure rotation tachometer devices and uses cord and pulley means from the rotating devices to translate the rotation movement into horizontal and vertical displacement movement.

However, the Relative Speed Indicator disclosed in the '137 patent is not particularly suited for retrofit into the typical mass-produced automobile, especially those that are fitted with traditional side-by-side pure-rotation tachometers for vehicle speed and engine speed. The arrangement of the '137 patent only facilitates the desired graphical display when the tachometer devices of the automobile can be arranged perpendicularly to the line-of-sight of the driver, which is completely at odds with the current practice of the mass-manufactured automobile. Also, in the two embodiments of the '137 patent, atypical calibration of the axes and gradations (not evenly spaced) will be required for the device to accurately display the correct rotation speeds and gearing ratio relationships for the device to convey accurate information to the driver of the vehicle about the two rotating devices, particularly in the preferred embodiment in which one of the needles is pinned at one end to the zero-point and is pulled about its free end by the engine speed tachometer. In such an arrangement, while the free end of that needle is pulled by the engine speed tachometer at a rate proportional to the change in the engine speed, the speed of the point at which the needle intersects with the bottom of the graduated window will only move at a rate that becomes more and more erroneous with the accumulation of engine speed, since the point at which the needle crosses that bottom-of-the-window axis travels further and further down the needle. To compensate, the graduations could be arranged out-of-proportion as the engine speed increases, but this is not claimed in the '137 patent, since such a relationship would result in engine speed-to-vehicle speed ratios that could not be illustrated on the background as simple horizontal lines. They would have to progressive slope with increasing gear ratio and more and more severely as they traverse the background of the gauge, as opposed to the claimed parallel lines of the '137 patent. The alternate embodiment is shown in Figure '137's FIG. 7, in which it is presumed that the relative speeds are arranged on perpendicular rather than parallel axes, and both needles traverse the background of the gauge in purely translative manner, as opposed to one needle rotating about the zero point. In such an arrangement, the gearing ratios between the two devices are correctly illustrated as lines that converse about the zero point. Such a device is more logical to read, as it assigns each speed a single dimension, either horizontal or vertical, rather than asking the driver to remember which of the horizontal axes is correlated with which rotating device. However, given the nature of how such a device could feasibly be produced, the device's lines would have to be set during the production process and would only correlate to a single instance of a vehicle's gearing. The present invention is designed with fit to a multitude of vehicles in mind. The invention of the '137 patent could be rendered useless by the driver's merely changing a vehicle's gearing set-up by installing a different transmission or differential, whereas the device of the present invention would only need minor adjustment.

SUMMARY OF THE INVENTION

An intersecting-needle engine-speed and vehicle-speed indicating gauge adapted to optimize gearshift engagements is described in which means are provided for representing vehicle speed, engine speed, and selected gear ratio in a single viewing field. One indicator points to the vehicle speed, and a second indicator, preferably mounted perpendicularly to the first, points to the engine speed. Where the two indicators cross while the vehicle is being driven with a gear is engaged to link the engine to the propelling wheels is bound by the product of vehicle's installed scaling transmission ratio for that engaged gear and differential final drive ratio. This product is the overall drive ratio and can be used to correlate the engine speed and vehicle speed of the vehicle. Plotting several of these points for each engaged gear yields a series of plotted lines which indicate what engine speeds are necessary to drive a vehicle at a desired speed. Using intersecting needles and plots of a vehicle's overall drive ratios that correlate with the selection of each transmission gear, engine speed may be accurately synchronized with vehicle speed and vehicle speed may be accurately synchronized with engine speed while changing to a different gear or when preparing the vehicle or engine to match a corresponding desired respective engine or vehicle speed momentarily before changing to a different gear.

It is an object of the invention to provide an improved combined speedometer and tachometer by supplementing or replacing existing installed tachometers and speedometers in vehicles that have already been sold and are already equipped with an independent radial tachometer and speedometer.

It is another object of the invention to provide a combined speedometer and tachometer in which the speed of the vehicle is indicated by an indicator needle on a linear graduated scale, and the engine speed is indicated by another indicator needle on another linear graduated scale, which overlaps the first indicator, and engaged gear ratio is indicated by function lines composed of points traced by the intersection of the two overlapping needles on the face of the device lying in the line of sight of the two needles and additionally as a backlit or etched or otherwise applied line directly on the faceplate of the device.

BRIEF DESCRIPTION OF THE DRAWINGS

FIG. 4 is a front elevation view of an alternate, more complex embodiment of the invention which allows the original vehicle's tachometer and speedometer needles and their graduations to be used without the housing of the device blocking their view, and showing permanently viewable plots of engaged-gear vehicle-speed-to-engine-speed relationships.

FIG. 5 is a cutaway detail view of the alternate embodiment shown in FIG. 4, showing an adapter piece to allow the original speedometer to be used across a range that is not obscured by the housing of the device without moving removing the original needle.

FIG. 6A(1) shows a front perspective view of a clip for frictional engagement of an original dial boss.

FIG. 6A(2) shows a rear perspective view of a clip for frictional engagement of an original dial boss.

FIG. 6B shows a rear perspective view of an alternate clip for engagement of an original dial boss by use of an adhesive.

FIG. 6C shows a perspective view of a rotation input delivery means using a semi-flexible cable with an internally rotating inner shaft inside an outer protective and grip-able sheath.

FIG. 6D shows a perspective view of an alternate rotation input delivery means using a tensioned-element pulley system.

FIG. 6E shows a side sectional view of an end portion that is common to multiple alternative rotation input delivery means.

FIG. 7A shows an exploded front perspective view of a tachometer-needle-to-engine-speed-translation assembly inside of an aesthetic-faceplate-housing of a gauge.

FIG. 7B shows a perspective view of a tachometer-needle-to-engine-speed-translation assembly inside of an aesthetic-faceplate-housing of a gauge.

FIG. 7C shows an exploded front perspective view and a front perspective view of a speedometer-needle-to-vehicle-speed-translation assembly, inside of an aesthetic-faceplate-housing of a gauge.

FIG. 7D shows a front perspective view of a tachometer-needle-to-engine-speed-translation assembly inside of an aesthetic-faceplate-housing of a gauge.

FIG. 7E shows an exploded perspective view of a gauge housing a tachometer-needle-to-engine-speed-translation assembly and speedometer-needle-to-vehicle-speed-translation assembly.

FIG. 7F shows a perspective view of a gauge with its face removed, to show a tachometer-needle-to-engine-speed-translation assembly and speedometer-needle-to-vehicle-speed-translation assembly.

DETAILED DESCRIPTION OF THE INVENTION

Figure 1:
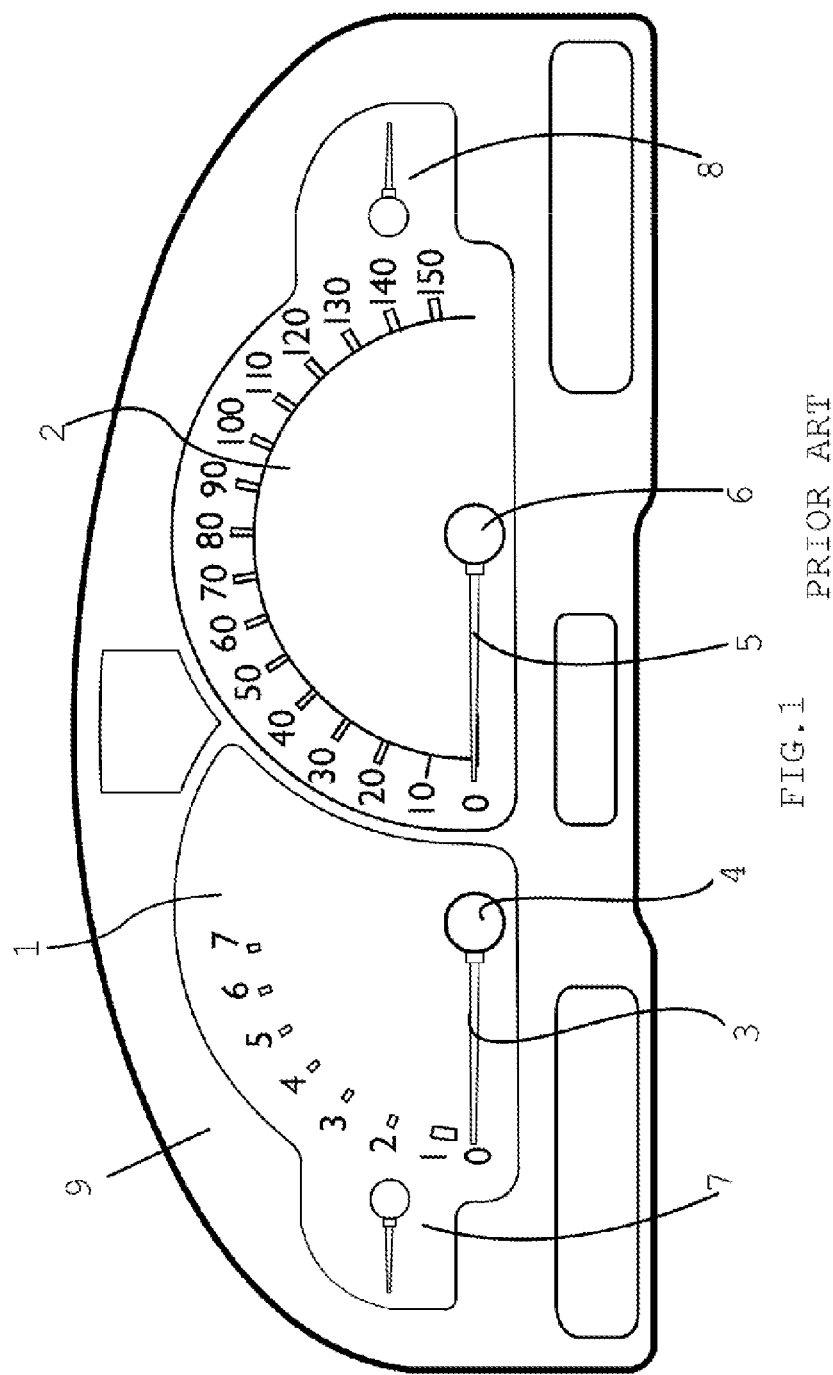
FIG. 1 is a front elevation view illustrating an existing vehicle's prior art gauge cluster.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough, complete, and will fully convey the scope of the invention to those skilled in the art. Like numbers refer to like elements throughout.

The invention relates to a combination of a speedometer and a tachometer for use in an automobile that has multiple gear ratios for using an engine or motor to propel the vehicle to higher velocities while still affording sharp acceleration from a rest. To drive such a vehicle throughout its range of speeds, if the vehicle is equipped with a driver-controlled gear-changing device, such as a manual transmission (with or without a clutch) or an automatic transmission having a parallel shifter assembly that allows a driver to intervene in an otherwise automatically controlled shift pattern, the driver must decide when it is appropriate to select and engage a gear. Such vehicles are typically sold with a speedometer and a tachometer installed by the original manufacturer, and the typical appearance of these gauges is of two large circular or semicircular dials with graduated scales around the circumference of each dial indicating a range of engine speeds, typically revolutions per minute for engine speed and either kilometers per hour or miles per hour for vehicle speed. To indicate which of the values is the one at which the vehicle is instantaneously operating, each dial is equipped with a radial needle which rotates about a boss in the center of its dial's circumference's arc. These radial dials provide easy legibility for deciphering either engine speed or vehicle speed but as they are independent dials, do not provide a direct correlation to guide a driver's gear selection to match the two dissimilar speeds.

The present invention uses the existing radial tachometer and speedometer of a post-production-and-sale vehicle to drive two speed indicators that can move independently on a single combined coordinate field by translating the existing needles' radial motion into purely translational motion. The operator of the vehicle sees two needles move linearly on a common plane in non-parallel fashion so that the two needles always overlap and the needles travel between the ranges of 0 engine speed and maximum engine speed and 0 vehicle speed and maximum vehicle speed. The intersection of the engine-speed and vehicle-speed indicator needles visually presents two uni-dimensional scales for informing the driver of the operating speed of two different devices, just as with independent radial scales for a speedometer and a tachometer, but by drawing a shared coordinate field with dimensions of the ranges of these two independent linear dimensions, the gauge visually represents the combined motion of the vehicle-engine as a conjoined device, tracing a single path within a field of operating conditions by moving the "crosshairs" formed by the intersecting engine speed and vehicle speed indicators. As a result, a driver no longer needs to think of numbers to coordinate a gearchange. With plots of the overall gear ratios drawn on the face of the device and in the line of sight of the two overlapping indicators, The driver can look at the gauge and visually estimate how much the engine needs to slow or accelerate to approximate the necessary engagement coordinates of the overall drive ratio correlating with the next transmission gear and current or desired velocity of the vehicle.

Referring now to the figures, FIG. 1 illustrates an instrument cluster 9 in a vehicle equipped with a plurality of radial-dial-and-needle instruments, including a typical radial tachometer 1, a typical radial speedometer 2, with tachometer needle 3 and tachometer boss 4, and with speedometer needle 5 and speedometer boss 6. This vehicle also has a typical radial-dial-and-needle engine temperature gauge 7 and fuel tank volume gauge 8. The engine of the vehicle with cluster 9 is indicated to be at 0 rpm by looking at the end of the tachometer needle 3 and 0 mph by separately looking at the speedometer needle 5.

Figure 2:
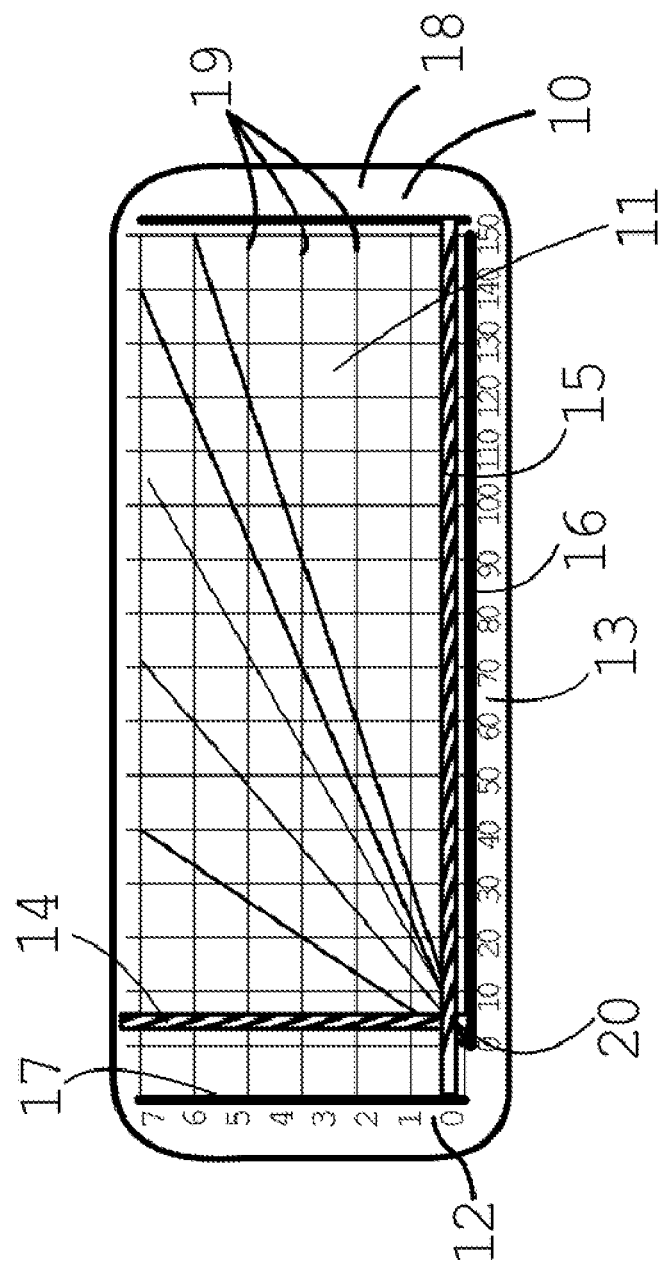
FIG. 2 is a front elevation view illustrating the simplest preferred embodiment of the invention, without any plots of engaged-gear vehicle speed to engine speed relationships.

FIG. 2 shows a simple embodiment of the present invention, having an aesthetic faceplate-housing 10, which houses a plurality of visible discrete components on its face 18: a shared coordinate field 11 bound by both the dimensions of an engine-speed axis 12 and a vehicle-speed axis 13, as well as the range of motion of a vehicle-speed indicator 14 and an engine speed indicator 15. The vehicle-speed indicator 14 of FIG. 2 is a vertical translucent needle that is approximately the length of the vertical engine-speed axis 12 and travels along the length of a horizontal slot 16 that is approximately the length of the vehicle-speed axis 13. The engine-speed indicator 15 of FIG. 2 is a horizontal translucent needle that is approximately the length of the horizontal vehicle-speed axis 13 and travels along the length of a vertical slot 17 that is approximately the length of the vertical engine-speed axis 12.

Because the dimensions of the engine speed range and the dimensions of the vehicle speed range are independent variables dictated from the independent radial dial inputs from the radial tachometer 1 of FIG. 1 and radial speedometer 2 of FIG. 1, the area of the coordinate field (11) that is potentially traceable by the intersection (20) of the engine-speed indicator (15) and the vehicle-speed indicator (14) forms a four-sided parallelogram, regardless of the angle of axes (12, 13) with respect to one another. It is particularly a useful shape when represented in the preferred arrangement, with the axes (12, 13) at a right angle to one another, and the indicators (14, 15) at right angles to one another, as shown in FIGS. 2-7. The engine-speed indicator 14 and the vehicle-speed indicator 15 cross at the point of intersection 20.

FIGS. 2, 3, 6, 7, 8 show embodiments of the device, wherein a grid 19 is formed across the coordinate field 11 by projecting horizontally lines (of the same length as the engine-speed axis 12) parallel to the engine-speed axis 12 at consistent increments of the vehicle-speed axis 13 and by projecting lines parallel to the vehicle-speed axis 13, vertically across the coordinate field 11 at consistent increments of the engine-speed axis 12.

Figure 3:
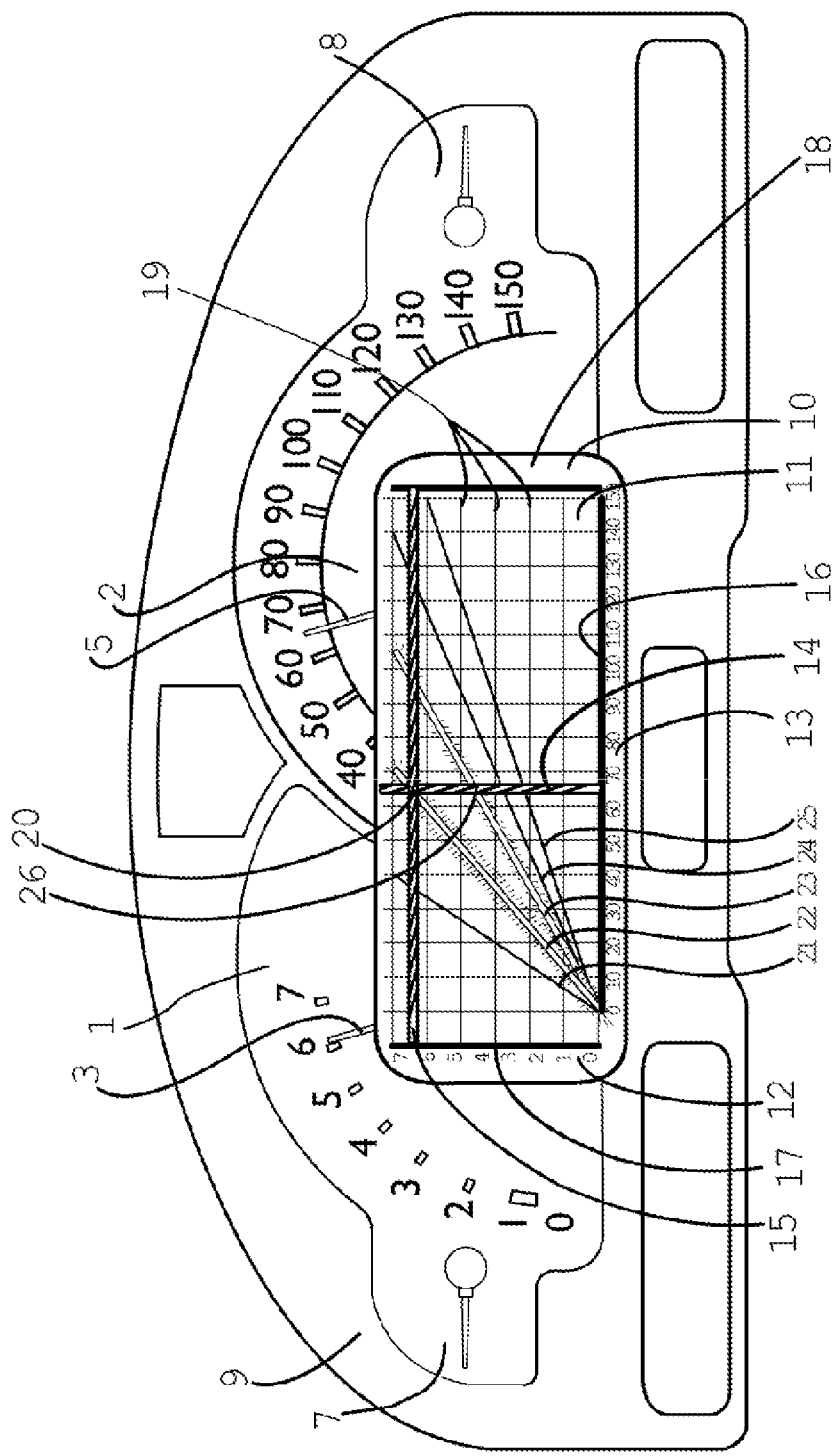
FIG. 3 is a front elevation view of how the preferred embodiment would fit into place on an existing vehicle's gauge cluster, while operating in "dynamic" mode and displaying the vehicle as near redline in $2^{nd}$ gear, with the plots for $2^{nd}$ and $3^{rd}$ gears' engaged-gear vehicle-speed-to-engine speed relationships lit and visible and also showing the unlit plots for the $1^{st}$, $4^{th}$, and $5^{th}$ gears.

FIG. 3 shows the typical preferred embodiment of the invention in place on an otherwise unmodified vehicle instrument cluster 9 while driving the vehicle at 65 mph and 6500 rpm in $2^{nd}$ gear. Like FIG. 2, this embodiment of the invention has a faceplate-housing 10, with face 18, a coordinate field 11 with grid 19, engine-speed axis 12, vehicle-speed axis 13, engine-speed indicator 14 riding in a slot 17, vehicle-speed indicator 15 riding in a slot 16, and a point of intersection 20 of the two indicator needles. Unlike FIG. 2, this embodiment of the invention additionally shows backlit plots (21, 22, 23, 24, and 25) of the overall gear ratio of the vehicle's drivetrain for corresponding gears of the vehicle's 5-speed transmission. When the device's backlit paths (21, 22, 23, 24, 25) are adjusted for the correct angle along the field's 11 grid 19 to represent the vehicle's overall gear ratios for each selected transmission gear, then when a gear is selected, the point of intersection 20 of the indicator needles (14, 15) will follow the path designated by that gear's corresponding backlit overall-gear-ratio plot (one of 21-25) when that path's corresponding transmission gear is selected.

Here, with the vehicle moving at 65 miles per hour and 6500 rpm in $2^{nd}$ gear, the engine-speed indicator 15 is kissing up against the upper edge of the coordinate field's 11 grid 19, but the vehicle speed indicator 14 is only about halfway through its range of motion. Since $2^{nd}$ gear is selected and this is an embodiment of the invention in which the display is "dynamic," the plot of the overall drive ratio (22) corresponding to $2^{nd}$ gear is brightly lit, and because the vehicle has approached its redline, the plot of the $2^{nd}$ gear overall drive ratio 22 has changed its color to red.

Ordinarily, the overall gear drive ratio (22) would just be lit some other color, such as white or green. Since the engine-speed is high, the plot of the overall gear ratio (23) corresponding to $3^{rd}$ gear is also illuminated, but in some color other than red, to let the driver know that the vehicle can be upshifted into that gear, 3rd. If the vehicle were upshifted into third at this point, the vehicle would, at that instant, stay roughly around 65 mph, but the engine-speed would fall to the engaged-gear engine-speed corresponding to the present vehicle-speed and the selected gear.

The device in FIG. 3 tells the driver exactly the speed that the engine will fall to if he could shift instantaneously without losing any vehicle speed, as illustrated by the vehicle-speed indicator 14. The vehicle-speed indicator 14 would remain at 65 miles per hour, but the $2^{nd}$ gear overall gear ratio plot (22) would de-luminate while the $3^{rd}$ gear overall gear drive ratio plot (23) would become the selected path for the point of intersection 20 of the vehicle-speed indicator 14 and engine-speed indicator 15. The engine-speed indicator 15 would fall to the instant intersection 26 of the $3^{rd}$ gear overall gear ratio plot 23 and the vehicle-speed indicator 14.

Also, in FIG. 3, the zero engine-speed position of the vehicle's tachometer 1 needle 3 is visible, suggesting that the needle can still function while the device's aesthetic-faceplate-housing 10 is placed in a central position within the original vehicle's instrument cluster 9. However, since the vehicle's actual engine-speed is 7000 rpm, the correct position of the needle 3 is barely visible above the device's aesthetic-faceplate-housing 10. Even worse, the vehicle's original speedometer 2 needle 5 is not visible with the device in place below 60 mph. To remedy the problem, alternate embodiments facilitate less impeded usage of the original dials (1, 2).

FIG. 4 shows an alternate embodiment of the device that facilitates use of the invention with less compromise of the function of the vehicle's original radial speedometer 2 and tachometer 1. In FIG. 4, original radial speedometer 2 and tachometer 1 are respectively directly behind and obscured from view by decorative rear flanges 32 and 29, which are both detailed further, below. The embodiment shown in FIG. 4 has a shorter-profile face 18(*a*) than the face 18 of the embodiments shown in FIGS. 2 and 3 with the aesthetic-faceplate-housing 10(*a*) shaped to the particular vehicle's instrument cluster 9. The outer edge of the aesthetic faceplate housing 10(*a*) has a slot 30 that the original tachometer's 1 needle 3 extends through and has a slot 31 that a parallel needle 5' (attached to the original speedometer's 2 needle 5 (FIGS. 1, 3, 5) extends through. The Original speedometer (2)'s needle (5) is obscured in FIG. 4 by the aesthetic faceplate housing 10(*a*).

While the vehicle-speed-indicator 14 and the engine-speed indicator 15 and vehicle-speed axis 13 are located similarly to that of the other embodiments, the embodiment shown in FIG. 4 has a centrally located engine-speed axis 12. The aesthetic-faceplate-housing 10(*a*) also has decorative rear flanges 29 and 32 that carry numeric graduations 36 and 37, each being spaced at the same increments as the original vehicle's radial-dial speedometer 1 and tachometer 2. Unlike the original tachometer's graduations, however, the numerals of 36 and 37 are placed at a radial distance from the speedometer boss 4 and tachometer boss 6 that is greater than the numerals of the original speedometer 1 and tachometer 2, respectively. This re-radiusing of the indicated numerals for the needles (3 and 5) of the original speedometer 1 and tachometer 2 on the decorative rear flanges 29 and 32 allows the profile of the aesthetic-faceplate-housing 10(*a*) to be a bit taller than housing 10 (FIGS. 2 and 3) without completely obscuring the numerals, but the height of the aesthetic-faceplate-housing 10(*a*) is still limited by the length of the original tachometer needle 3.

The overall gear ratio plots (21, 22, 23, 24, 25) on the embodiment shown in FIG. 4 are merely translucent and are not dynamically lit as described of the overall gear ratio plots of the embodiment in FIG. 3. The speedometer's numerals 37 (on decorative rear flange 32) are also radially shifted with respect to the location of the numerals on the original vehicle's instrument cluster 9 (FIG. 1), so that the needle (5') in the embodiment shown in FIG. 4 can articulate between 0 and 120 mph fully within the symmetric shape of the aesthetic-faceplate-housing's (10(*a*)) rear flanges' (29 and 32) symmetric shape. If 120 mph is exceeded, the embodiment shown in FIG. 4 has a true-vehicle-speed-range arm 33 that is spring-loaded 34 to swing out from the underside and behind of the aesthetic-faceplate-housing 10(*a*) and rightmost decorative rear flange 32. If the driver wishes to fold the arm away, it easily snaps back into place with a ratcheting-sliding-engagement latch 35.

FIG. 5 shows a cutaway of the part of the face 18(*a*) (FIG. 4) that obscures the area surrounding the original vehicle's radial-dial speedometer 2 boss 6. The cutaway shows how the original radial-dial speedometer 2 needle 5 has been shifted to match the circumferentially displaced numerals 37 of FIG. 4 for parallel needle 5' by the boss-and-needle-engaging bracket 28.

FIGS. 6A(1) through E show views of alternate ways that the device can be driven by the original vehicle's tachometer 1 boss 4 and speedometer 2 boss 6.

FIGS. 6A(1) and 6A(2) show a potential clip for frictional engagement of an original dial boss (4 or 6) FIG. 6A(1) shows a close front perspective view while FIG. 6A(2) shows a close rear perspective view. This clip is shaped to be slid on to a boss (4 or 6) by passing the boss into the body 39 of the clip via the upper and lower slots 41 and 42 of the upper and lower gripping arms, past the beveled one-way-flexing-lip 43 on the upper slot 41 and the beveled one-way-flexing-lip 46 on the lower slot 41. Then the upper and lower arms 47 and 48 flex to retain the boss (4 or 6) within the slightly tapered conical/cylindrical cavity 40, with the beveled tips 46 and 45 of the respective upper and lower arms 48 and 47 butting back together once the boss (4 or 6) is fully retained within the cavity 40. The beveled tips 46 and 45 are parted in the center of the clip by a hole 44, which is shaped to receive the boss-(4 or 6)-supporting shaft of the original vehicle's instrument cluster's (9) radial-dial tachometer (1) motor. The clip has an output shaft 38 for engaging alternate rotation delivery means.

FIG. 6B shows a close rear perspective view of an alternate clip for engaging the boss (4 or 6) using adhesive 51 disposed on the rear face of the body 50 to engage the front face of the boss (4 or 6) with the output shaft 49.

FIG. 6C shows an embodiment of the rotation delivery means. It is a semi-flexible cable with an internally rotating inner shaft 53 inside an outer protective and grip-able sheath 54. At one end of the cable is a receiving collar 52A for the output shafts of either of the boss-engaging clips shown in FIGS. 6A(1) and 6A(2) and 6B. At the other end of the cable is a receiving collar 55 suitable to engage one of the input drive shafts (56A (FIGS. 6E, 7A, 7D); 56B (FIG. 7C)) of the device/present invention.

FIG. 6D shows an alternate embodiment of the rotation delivery means. It is a pulley system that uses either a chain or a cord or a belt (58) in tension about two pulleys (57A and 57B), to transmit rotational motion of the boss (4 or 6) to an input shaft (FIG. 6E, 56A) of the device/present invention. For positioning the device relative to the specific location of various speedometer-tachometer pairings of any given car, the distance between these two pulleys (57A and 57B), and therefore the lateral distance between the boss (4 or 6) and the input shaft of the device, is set by the lateral support plate 59, which can be cut-to-length by the owner of the vehicle wishing to install the device.

To allow a multitude of vehicles to be served by a single version of this rotation delivery system, there are tension arms 60 and 61 equipped small pulleys 63 and 62 at their ends to engage the chain/cord/belt 58 and springs 64 and 65 maintain the tension in the chain/cord/belt 58 by forcing the tension arms 60 and 61 away from the lateral support plate 59. Like FIG. 6C, the rotation delivery means shown in FIG. 6D takes its input by a receiving collar 52B from either output shaft of either 38 or 49 from FIG. 6A or 6B, respectively, and produces its output through a receiving collar 55 for engaging an input shaft (FIG. 6E, 56A) of the device/present invention.

FIG. 6E shows the end portion that is common to both of the rotation delivery means of FIGS. 6D and 6C, in side view, with their respective receiving output collars 55 oriented for receiving an input shaft of the device/present invention 56A. It is not shown here whether the entire assembly described from boss (4 or 6) to device input shaft (56A or 56B) pertains to the engine-speed or vehicle-speed data. It does not matter because the assembly would be the same for either input-output path. The cable has the advantage of being easy to connect and position during installation but is likely to vibrate as it is not very stiff and is only held in place by the device and the supports for the radial-dial boss (4 or 6) that it is connected to.

FIG. 7A shows an exploded front perspective view of the tachometer-needle-to-engine-speed-translation assembly, with input shaft 56A protruding through the back of the aesthetic-faceplate-housing 10 through a hole 66 and supported by a bearing 67. Input shaft 56A is connected to damper wheel 68 which abuts the bearing 67. The input shaft 56A extends through the damper wheel 68 and meshes with reduction gear 69 which rides on axis 70. Reduction gear 69 drives pulley gear 71, which drives flexible cord 74, which is stretched taut between pulley gear 71 and pulley 72 by the upper pulley's 72 spring-tightened axis 75 (as can be seen in FIG. 7B). The engine-speed indicator 15 is connected to the flexible cord 74 by cord grip 15A.

FIG. 7B shows a perspective view of the tachometer-needle-to-engine-speed-translation assembly, showing the spring-tensioned axis 75 of upper pulley 72. It also shows the geometry that allows cord grip 15A and slot 17 to provide rotational location about the vertical axis to the engine-speed indicator 15 to hold it roughly parallel to the grid 19 on the coordinate field 11 face 18 of the present invention.

FIG. 7C shows an exploded front perspective view and a front perspective view of the speedometer-needle-to-vehicle-speed-translation assembly, with input shaft 56B protruding through the back of the aesthetic-faceplate housing 10 through a hole 76 and supported by a bearing 77. Input shaft 56B is connected to damper wheel and gear 78, which drives pulley gear 79, which is connected to pulley 80. Pulley 80 moves thick cord 81. Thick cord 81 is necessarily much thicker and less flexible than cord 74 of FIG. 7A because it must support the weight of engine-speed-indicator 14 and its cord grip 14A in a direction that is transverse to its direction of tension directly against the force of gravity. The thickness of cord 81, vehicle-speed-indicator's 14 location via its cord grip 14A on the lower run of cord 81 and pinched vertically between the upper run of cord 81 and where indicator 14 protrudes through slot 16 (as shown in FIG. 8) give the vehicle-speed-indicator its security of location about the horizontal axis.

FIG. 7D shows the left-most end of the speedometer-needle-to-vehicle-speed-translation assembly with left-end pulley 82 and showing where the engine-speed-indicator's (14) cord grip 14A attaches to the lower run of the thick cord 81.

FIG. 7E shows the exploded front perspective view of the inside of the aesthetic-faceplate-housing 10 of the present invention. This view is primarily just shown to give a wider-angle context to FIGS. 7A and 7C(1).

FIG. 7F shows a perspective views of the inside of the aesthetic-faceplate-housing 10 of the present invention without a face installed, but in the context of several components of a face (18, FIGS. 8A-D) in place. This view is primarily just shown to give a wider-angle context to FIGS. 7B, 7C(2), and 7D.

Figure 8D:
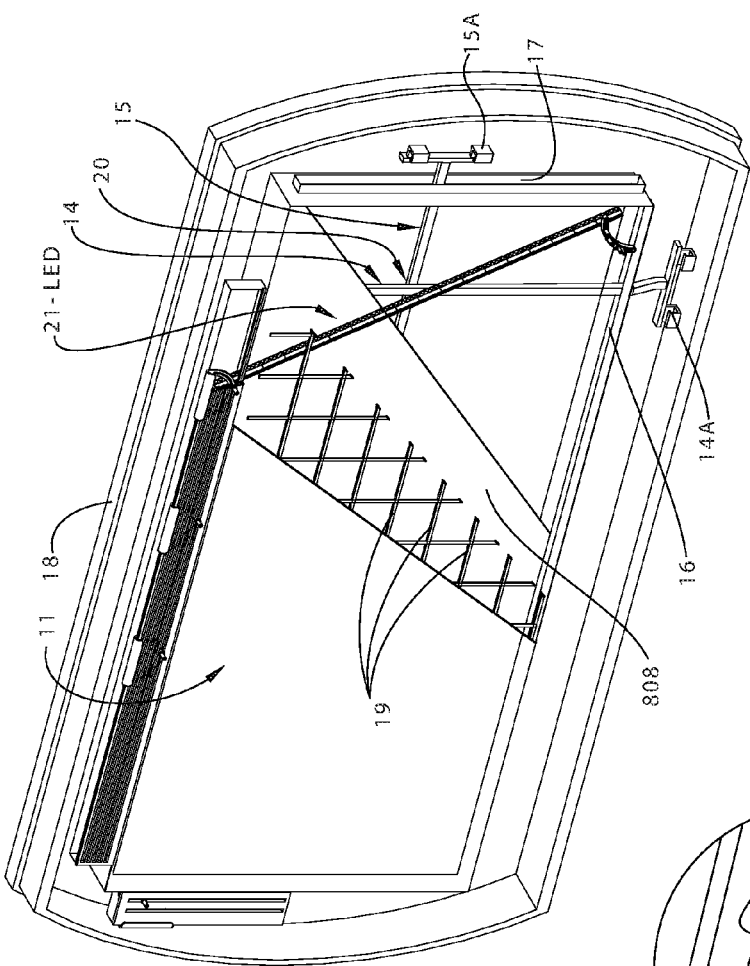
FIG. 8D shows a perspective view of the inside of face of a gauge capable of supporting multiple modularly adjustable gear ratio plots, in isolation from the housing of the gauge, to display one modularly adjustable gear-ratio plot and its components.
Figure 8C:
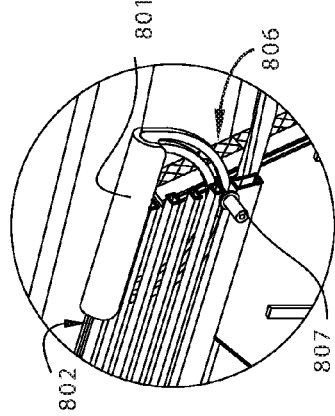
FIG. 8C shows a closer perspective view of the upper end of a modularly adjustable gear-ratio-plot, where it engages the fixed and non-adjustable structure of a gauge by terminating on a sliding element which is alternately slidable and affixable to the fixed structure of the gauge.

FIG. 8D shows a rear perspective view of the inside of the face 18 of the device/present invention, as removed from the aesthetic-faceplate-housing 10 (FIGS. 2, 3, 7A-F). The embodiment shown is designed to backlight the overall-gear-ratio plot 21-LED in a viewer-driver's line of sight with respect to aiding the viewer-driver to align the point of intersection 20 of the engine-speed-indicator 15 and vehicle-speed indicator 14 with the overall-gear-ratio plot 21-LED in order to adjust vehicle speed and engine speed to reach an optimum clutch-re-engagement point.

Each backlit overall-gear-ratio-plot 21-LED has to be adjusted to the appropriate overall gear ratios of a particular vehicle as a part of installation. To facilitate these plots, of theoretically infinite variety of length and angle, on this universal device of the present invention, each plot-line 21-LED is composed of interlocking segments.

Figure 8A:
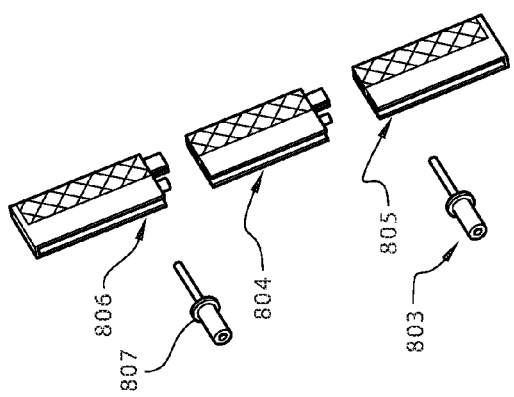
FIG. 8A shows a close, exploded, perspective view of interlocking segments of a modular adjustable gear-ratio-plot of a gauge comprising modular segments and conducting and lighting components.

Referring now to FIG. 8A, the interlocking segments are shown, including parallel-circuit LEDs modular segments 804, with a top-end cap 806 and an at-zero cap 805.

Figure 8B:
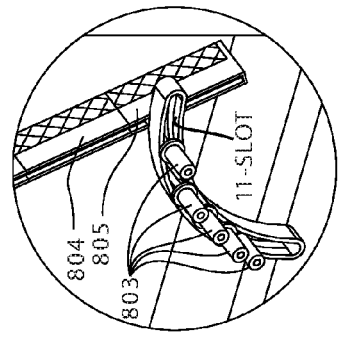
FIG. 8B shows a close perspective view of the lower end of a modularly adjustable gear-ratio-plot, where it engages the fixed and non-adjustable structure of a gauge through a slot in fixed structure that was otherwise sectioned out of view in order to provide the view

Referring now to FIG. 8B, the at-zero cap 805 engages through a slot (11-SLOT) in the with a threaded conducting pole 803 and the top-end-cap 806 is locked in place by locking it to an above-grid ridge 802 by pinching the ridge 802 between a set screw 807 and a threaded tension bracket 801. Each plot-line 21-LED of parallel-circuit LEDs modular segments 804 is marginally thin, so 5 or more plot lines are mountable within the depth of the present invention's face 18 and the aesthetic-faceplate-housing 10 of the preferred embodiment.

The embodiment shown in FIG. 8D, has at least one backlit overall gear ratio plot 21-LED, and the area on the face 18 that carries the coordinate field (11) as a background for siting the point of intersection 20 comprises a dark tinted but translucent pane 808. Energizing the backlit overall gear ratio plot 21-LED shines light from each of its LED modular segments 804 (and/or its at-zero cap 805 and the top-end-cap 806) through the dark tinted but translucent pane 808. Therefore, selectably energizing or de-energizing the backlit overall gear ratio plot 21-LED displays or hides the position and slope of gear ratio plot 21-LED. If there are multiple overall gear ratio plots like 21-LED, then the dark tinted but translucent pane 808 facilitates a cleaner appearance of a gauge which has a face 18 that selectably displays only the instantly active gear ratios to aid a viewer-driver to visually track the point of intersection 20.

The dark-tinted but translucent pane 808 therefore provides the embodiment shown FIG. 8D with high visibility of each relevant gear ratio plot as necessary, but without having to display every gear ratio plot (such as in FIGS. 2, 3, 4), and without exposing the inner-workings.

I claim:

1. A post-vehicle-ownership, "universal" fit engine speed and vehicle speed indicator gauge and speed-matching device, comprising:

an aesthetic faceplate-housing, a graduated linear engine speed axis, a graduated linear vehicle speed axis, at a non-parallel angle to the graduated linear engine speed axis, an engine speed indicator, which intersects and traverses along the length of the graduated linear engine speed axis, a vehicle speed indicator, which intersects and traverses along the length of the graduated linear vehicle speed axis, wherein the engine speed indicator and vehicle speed indicator continuously overlap as the engine speed indicator traverses along the graduated linear engine speed axis and the vehicle speed indicator traverses along the graduated linear vehicle speed axis, defining a point of intersection, wherein the area drawn on the background of the aesthetic faceplate-housing by the outermost possibilities of locations for the point of intersection defines a single continuous coordinate field of points of simultaneous engine speeds and vehicle speeds, wherein every location within the continuous coordinate field defines a potential location of the point of intersection of the engine speed indicator and vehicle speed indicator when the vehicle and its engine are simultaneously operating at the engine speed and vehicle speed coordinates of that location;

means for alternately releasably and rigidly interfacing with a vehicle's existing independent speedometer's pure-rotation and functionally non-overlapping speedometer needle in its as-finally-manufactured-in-a-vehicle's-instrument-cluster position;

means for alternately releasably and rigidly interfacing with a vehicle's existing independent tachometer's pure-rotation and functionally non-overlapping tachometer needle in its as-finally-manufactured-in-a-vehicle's-instrument-cluster position;

means for translating a vehicle's existing independently pure-rotational speedometer needle motion into purely-translational motion of the vehicle speed indicator; and means for translating a vehicle's existing independently pure-rotational tachometer needle motion into purely-translational motion of the engine speed indicator, wherein the means for interfacing with a tachometer and the means for translating into translational motion of the engine speed indicator are connected to one another by a tachometer-needle-to-engine-speed-translation assembly, the means for interfacing with a tachometer connecting to the input of the tachometer-needle-to-engine-speed-translation assembly, and the means for translating into translational motion of the engine speed indicator being driven by the output of the tachometer-needle-to-engine-speed-translation assembly, and the means for interfacing with a speedometer and the means for translating into translational motion of the vehicle speed indicator being connected to one another by a speedometer-needle-to-vehicle-speed-translation assembly, the means for interfacing with a speedometer connecting to the input of the speedometer-needle-to-vehicle-speed-translation assembly, and the means for translating into translational motion of the vehicle speed indicator being driven by the output of the speedometer-needle-to-vehicle-speed-translation assembly.

2. The post-vehicle-ownership, "universal" fit engine speed and vehicle speed indicator gauge and speed-matching device of claim 1, further comprising:

means for adjusting the motion behavior and lighting behavior of elements of the device, and further comprising a series of plotted function lines applied to the continuous coordinate field on the background of the aesthetic-faceplate-housing, wherein each function line indicates the locations of the set of points on the continuous coordinate field that the point of intersection on the engine speed indicator and vehicle speed indicator will trace when the vehicle is driven in the gear corresponding to the function line that are backlit by LEDs or an equivalent light source and are selectable to be lit according to a "static" or a "dynamic" pattern by the means for adjusting the motion behavior and lighting behavior of elements of the device.

3. The post-vehicle-ownership, "universal" fit engine speed and vehicle speed indicator gauge and speed-matching device of claim 2, wherein the discrete elements of the aesthetic-faceplate-housing, comprising: the engine speed axis, the vehicle speed axis, the engine speed indicator, the vehicle speed indicator, the point of intersection of the engine speed indicator and vehicle speed indicator, the background of the aesthetic-faceplate-housing, and the continuous coordinate field are:

backlit by LEDs or an equivalent light source and are selectable to be lit according to a "static" or a "dynamic" pattern by the means for adjusting the motion behavior and lighting behavior of elements of the device.

4. A method for indicating vehicle and engine speeds while optimizing gearshift accuracy for a vehicle with an existing pure-rotation tachometer and pure-rotation speedometer, comprising the steps of:
- providing an aesthetic faceplate-housing, and further providing:
  - a graduated linear engine speed axis,
  - a graduated linear vehicle speed axis, at a non-parallel angle to the graduated linear engine speed axis,
  - an engine speed indicator, which intersects and traverses along the length of the graduated linear engine speed axis,
  - a vehicle speed indicator, which intersects and traverses along the length of the graduated linear vehicle speed axis,
  - wherein the engine speed indicator and vehicle speed indicator are made to continuously overlap as the engine speed indicator traverses along the graduated linear engine speed axis and the vehicle speed indicator traverses along the graduated linear vehicle speed axis, defining a point of intersection,
  - wherein the engine speed indicator and vehicle speed indicator are made to draw an area on the background of the aesthetic faceplate-housing by way of traveling to their outermost extremities of possible locations for the point of intersection and defining a single continuous coordinate field of points of simultaneous engine speeds and vehicle speeds,
  - wherein every location within the continuous coordinate field defines a potential location of the point of intersection of the engine speed indicator and vehicle speed indicator when the vehicle and its engine are simultaneously operating at the engine speed and vehicle speed coordinates of that location;
- releasably and rigidly interfacing with a vehicle's existing independent speedometer's pure-rotation and functionally non-overlapping speedometer needle in its as-finally-manufactured-in-a-vehicle's-instrument-cluster position;
- releasably and rigidly interfacing with a vehicle's existing independent tachometer's pure-rotation and functionally non-overlapping tachometer needle in its as-finally-manufactured-in-a-vehicle's-instrument-cluster position;
- providing a tachometer-needle-to-engine-speed-translation assembly,
- providing a speedometer-needle-to-vehicle-speed-translation assembly,
- translating a vehicle's existing independently pure-rotational speedometer needle motion into purely-translational motion of the vehicle speed indicator with the speedometer-needle-to-vehicle-speed-translation assembly; and
- translating a vehicle's existing independently pure-rotational tachometer needle motion into purely-translational motion of the engine speed indicator with the tachometer-needle-to-engine-speed-translation assembly.

5. The method for indicating vehicle and engine speeds while optimizing gearshift accuracy of claim 4, for a vehicle with an existing pure-rotation tachometer and pure-rotation speedometer, further comprising the steps of:
- adjusting the motion behavior and lighting behavior of elements of the device, and
- applying plotted function lines to the continuous coordinate field on the background of the aesthetic-faceplate-housing, wherein each function line indicates the locations of the set of points on the continuous coordinate field that the point of intersection on the engine speed indicator and vehicle speed indicator will trace when the vehicle is driven in the gear corresponding to the function line and
- backlighting with LEDs or an equivalent light source and selecting them to be lit according to a "static" or a "dynamic" pattern by the means for adjusting the motion behavior and lighting behavior of elements of the device.

6. An engine speed and vehicle speed indicating and matching device, comprising:
- an aesthetic faceplate-housing, further comprising:
  - a graduated linear engine speed axis,
  - a graduated linear vehicle speed axis, at a non-parallel angle to the graduated linear engine speed axis,
  - an engine speed indicator, which intersects and traverses along the length of the graduated linear engine speed axis,
  - a vehicle speed indicator, which intersects and traverses along the length of the graduated linear vehicle speed axis,
  - wherein the engine speed indicator and vehicle speed indicator continuously overlap as the engine speed indicator traverses along the graduated linear engine speed axis and the vehicle speed indicator traverses along the graduated linear vehicle speed axis, defining a point of intersection,
  - wherein the area drawn on the background of the aesthetic faceplate-housing by the outermost possibilities of locations for the point of intersection defines a single continuous coordinate field of points of simultaneous engine speeds and vehicle speeds, wherein every location within the continuous coordinate field defines a potential location of the point of intersection of the engine speed indicator and vehicle speed indicator when the vehicle and its engine are simultaneously operating at the engine speed and vehicle speed coordinates of that location;
  - a series of function line plots applied to the continuous coordinate field on the background of the aesthetic-faceplate-housing,
  - wherein each plot indicates the locations of the set of points on the continuous coordinate field that the point of intersection on the engine speed indicator and vehicle speed indicator will trace when the vehicle is driven in the gear corresponding to the plot, the device being dynamic,
  - dynamic meaning that the device comprises a dynamic mode of operation that is adapted to selectably illuminate and de-luminate plots that are available gear plots,
  - an available gear plot being the plot corresponding to a gear that is an available gear,
  - an available gear being one having an overall gear ratio that sets the value of engine speed to a value within the engine's operating range for the instant value of vehicle speed,
  - operating range meaning a range of engine speeds that optimize the engine to be used to drive the vehicle, having a minimum value of engine speed and a maximum value of engine speed, and
  - wherein the device is selectably adjustable to fit or match the plots to the overall gear ratios of the set of gears of any vehicle with a multiple-gear ratio transmission.

7. The device of claim 6, and wherein each of the plots is illuminable by being lit along its length by plurality of lights that are individually energizable at points distributed along the length of the plot, one selected from a group comprising LEDs, parallel-circuit LEDs and equivalently illuminable light sources.

8. The device of claim 7, and wherein the lights are distributed along the length of the plot by lights being incorporated into a series of modular interlocking length appending units that are successively connectable to one another to facilitate the visible length of the plot.

9. The device of claim 6, and wherein the device is further dynamic by being adapted to selectably illuminate the selected gear plot,
the selected gear plot being the plot corresponding to the "selected" gear,
the selected gear being a gear that is selected to correspond engine speed and vehicle speed at an instant when the vehicle is being driven, and
wherein the device is further adapted to illuminate the selected gear plot in a first color and a first level of brightness when the selected gear is also an available gear.

10. The device of claim 9, wherein the device is further dynamic by being adapted to illuminate the selected gear plot in a second color and a second level of brightness and wherein the device is adapted to change the illumination of the selected gear plot by changing at least one of the level of brightness from the first level of brightness to the second level of brightness and the color from the first color to the second color.

11. The device of claim 9, the device being further dynamic by being adapted to illuminate the available gear plot that is the "next gear plot" when there are gears that are available gears for the instant values of vehicle speed and engine speed but where none of the available gears is selected,
a next gear plot being a plot corresponding to a "next" gear,
a next gear being an available gear which can be immediately selected by execution of a shift into the gear at the instant values of vehicle speed and engine speed that would set engine speed to a value that is within the operating range and which does not require engine speeds to increase to a value that is greater than the instant value.

12. The device of claim 11, and wherein the device is adapted to de-luminate the selected gear plot following execution of a shift from the selected gear to a next gear.

13. The device of claim 6, and further wherein the plots are adjustable and re-adjustable for angle and length to fit and match the overall gear ratios of any car or other vehicle with a multi-gear transmission.

14. The device of claim 13, and wherein the plots are further adjustable for length by comprising modular interlocking elements to increase length.

15. The device of claim 14, wherein the interlocking elements comprise LEDs, parallel circuit LEDs, or other equivalent light sources that are independently energizeable to be lit along the length of a plot.

16. The device of claim 13, and further wherein
each of the plots comprise a lower bound,
the plots do not intersect with the engine speed axis and the vehicle speed axis and do not intersect one another, and
the plots are further adjustable for scope by the lower bound of each plot being pivotably secured to a slot or arcuate slot or to a pivot point which is offset from the corner of the field,
the corner of the field being the point defining minimum vehicle speed and minimum engine speed.

17. The device of claim 6, and further wherein the indicators are translucent or are otherwise adapted to pass light therethrough, and aid alignment of the intersection with a gear ratio plot that is illuminated, to adjust vehicle speed and engine speed to reach an optimum clutch re-engagement point.

18. The device of claim 6, and further wherein the device is arranged with respect to the driver's line of sight such that the backlit plots are further away from the driver than a pane of darkened translucent material that reduces the visibility of the plots until they are energized to be illuminated, selectably displaying only the instantly illuminated plots, to aid a viewer-driver to visually track the point of intersection.

19. The device of claim 6, and wherein the device is further dynamic by being adapted to selectably illuminate the selected gear plot,
the selected gear plot being the plot corresponding to the "selected" gear,
the selected gear being a gear that is selected to correspond engine speed and vehicle speed at an instant when the vehicle is being driven, and
wherein the device is further adapted to illuminate the selected gear plot in a first color and a first level of brightness when the selected gear is also an available gear, and further,
wherein the device is further dynamic by being adapted to illuminate the selected gear plot in a second color and a second level of brightness and wherein the device is adapted to change the illumination of the selected gear plot by changing at least one of the level of brightness from the first level of brightness to the second level of brightness and the color from the first color to the second color, and further,
the device being further dynamic by being adapted to illuminate the available gear plot that is the "next gear plot" when there are gears that are available gears for the instant values of vehicle speed and engine speed but where none of the available gears is selected,
a next gear plot being a plot corresponding to a "next" gear,
a next gear being an available gear which can be immediately selected by execution of a shift into the gear at the instant values of vehicle speed and engine speed that would set engine speed to a value that is within the operating range and which does not require engine speeds to increase to a value that is greater than the instant value.

\* \* \* \* \*